United States Patent
Wetzka

(10) Patent No.: US 11,639,124 B2
(45) Date of Patent: May 2, 2023

(54) SILICONE-FILLED CAPSULES FOR TRIM COATINGS

(71) Applicant: LEAR CORPORATION, Southfield, MI (US)

(72) Inventor: Andre Wetzka, Rochester Hills, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/855,092

(22) Filed: Jun. 30, 2022

(65) Prior Publication Data

US 2022/0332232 A1 Oct. 20, 2022

Related U.S. Application Data

(63) Continuation of application No. 16/885,405, filed on May 28, 2020, now Pat. No. 11,407,345.

(51) Int. Cl.
| | | |
|---|---|---|
| *B60N 2/58* | (2006.01) | |
| *B60N 2/70* | (2006.01) | |
| *B29C 70/68* | (2006.01) | |
| *B29L 9/00* | (2006.01) | |
| *B29L 31/30* | (2006.01) | |

(52) U.S. Cl.
CPC ............. *B60N 2/5891* (2013.01); *B60N 2/70* (2013.01); *B29C 70/68* (2013.01); *B29L 2009/005* (2013.01); *B29L 2031/3041* (2013.01)

(58) Field of Classification Search
CPC ........ B60N 2/5891; B60N 2/70; B29C 70/68; B29L 2009/005; B29L 2031/3041
USPC ...................................................... 297/452.55
See application file for complete search history.

(56) References Cited

U.S. PATENT DOCUMENTS

| | | | |
|---|---|---|---|
| 5,461,884 A | 10/1995 | Depoe et al. | |
| 6,491,745 B1 | 12/2002 | Ashizawa | |
| 9,028,969 B2 | 5/2015 | Schmidt | |
| 11,407,345 B2 * | 8/2022 | Wetzka | B60N 2/5891 |

FOREIGN PATENT DOCUMENTS

| | | |
|---|---|---|
| CN | 107722236 A | 2/2018 |
| CN | 208343636 U | 1/2019 |
| CN | 109680509 A | 4/2019 |
| CN | 113580693 A | 11/2021 |
| DE | 10213984 A1 | 8/2003 |
| DE | 10394053 T5 | 12/2005 |
| EP | 2086670 B1 | 8/2009 |
| WO | 2008/059007 A2 | 5/2008 |

OTHER PUBLICATIONS

German Office Action for DE Application No. 102021112840.4 dated Jun. 28, 2022 75 pages.

* cited by examiner

*Primary Examiner* — Mark R Wendell
(74) *Attorney, Agent, or Firm* — Brooks Kushman P.C.

(57) ABSTRACT

A seat includes a framework; a foam body supported by the framework; and a trim cover assembly covering the foam body. The trim cover assembly includes a trim material and one or more coatings, with at least one of the one or more coatings including encapsulated silicone configured to release silicone oil upon abrasion of the at least one coating.

20 Claims, 3 Drawing Sheets

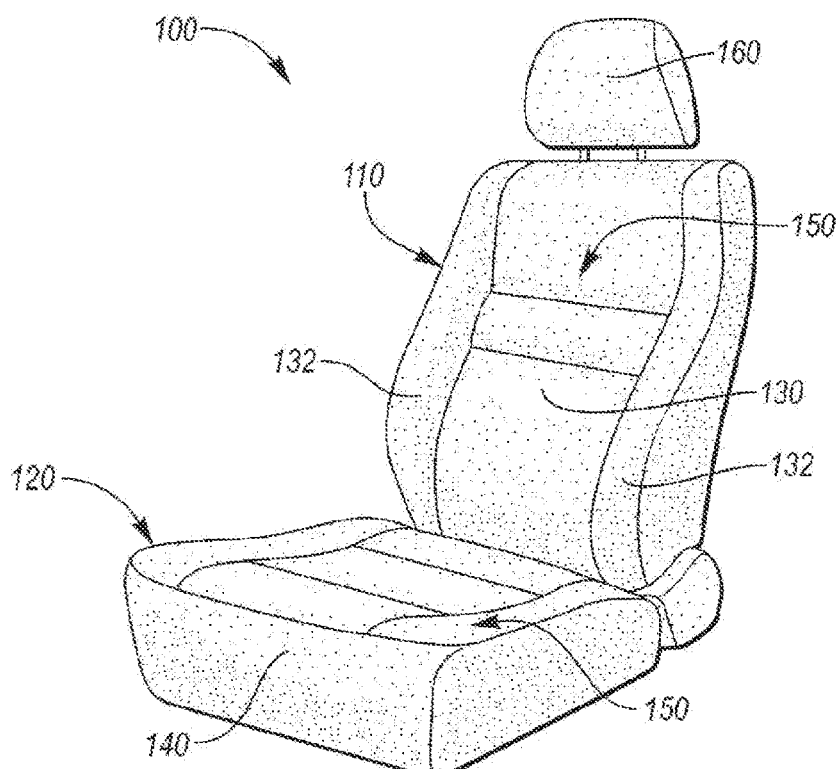
FIG. 1
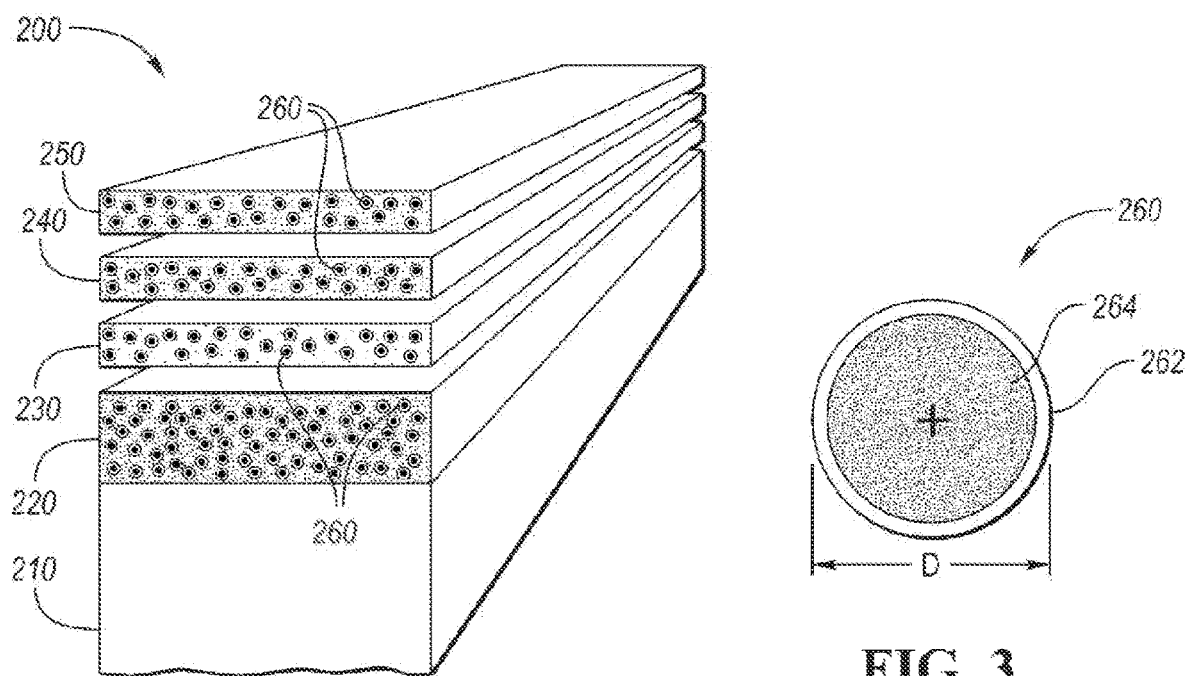
FIG. 2
FIG. 3

| Encapsulated Silicone | Taber 1 | Taber 2 | Taber 3 | Taber Ave |
|---|---|---|---|---|
| 0% | 1,000 | 3,000 | 3,000 | 2,333 |
| 1% | 5,000 | 10,000 | 10,000 | 8,333 |
| 5% | 11,000 | 11,000 | 12,000 | 11,333 |
| 10% | 12,000 | 12,000 | 12,000 | 12,000 |

US 11,639,124 B2

SILICONE-FILLED CAPSULES FOR TRIM COATINGS

CROSS-REFERENCE TO RELATED APPLICATIONS

This application is a continuation of U.S. application Ser. No. 16/885,405 filed May 28, 2020, now U.S. Pat. No. 11,407,345, issued Aug. 9, 2022, the disclosure of which is hereby incorporated in its entirety by reference herein.

TECHNICAL FIELD

The present application is directed to additives for automotive leather coatings, and more particularly, to encapsulated silicone in leather coatings.

BACKGROUND

Generally, a vehicle seat assembly includes three components: (a) a frame to support the seat assembly and to mount it to a vehicle; (b) a foam cushion to cover the frame; and (c) trim material to cover the foam cushion and provide a durable surface for contact with a vehicle occupant. Typically, the foam cushion is made from an expandable foam material, such as polyurethane, and is molded to a predetermined shape during a molding process. The trim material is secured over the cushion to cover the cushion. The trim material may include any number of materials, such as cloth, polymers, leather, or other suitable textiles. Leather or vinyl is typically selected as the trim material to impart a luxury feel to the occupant. Seat trim covers may be manufactured by stitching together multiple panels that may be cut from one or more trim materials.

In the trim material preparing process, the trim material may be coated during finishing to improve various properties to meet different specifications, such as those set by original equipment manufacturers. The trim material may be finished using one or more processing steps or techniques, and any number of coatings or a single coating with any number of additives. Non-limiting examples of finishing coatings for trim materials include polymeric resins, additives, and protectants (such as acrylic and polyurethane)

BRIEF DESCRIPTION OF THE DRAWINGS

FIG. 1 is a perspective schematic illustration of a representative vehicle seat assembly, according to an embodiment;

FIG. 2 is a schematic exploded illustration of a trim cover assembly, according to an embodiment.

FIG. 3 is a schematic illustration of encapsulated silicone, according to an embodiment;

DETAILED DESCRIPTION

Figures 4A, 4B:
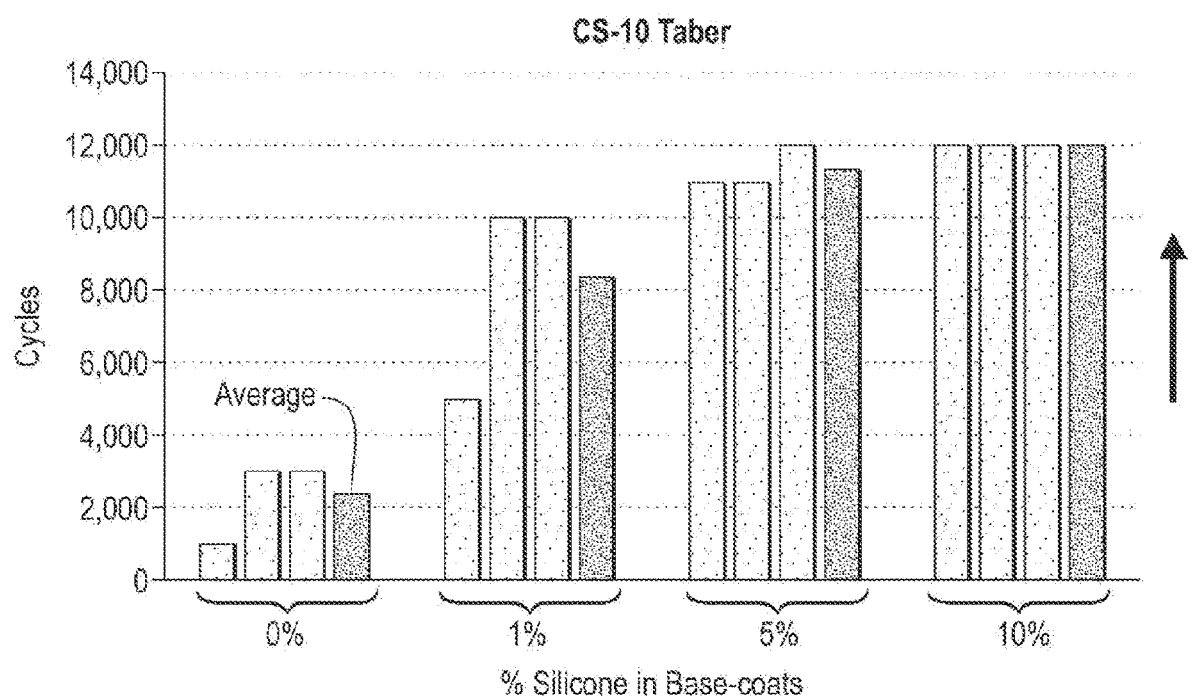
FIGS. 4A-B show Taber Test results for coatings with encapsulated silicone, according to embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Various textiles such as fabric, vinyl, or leather or automotive leather may be used in the manufacture of seat trim covers, which may be used in motor vehicle seats. Seat trim covers may be manufactured by stitching together multiple panels of trim materials, and may include any combination of trim materials.

FIG. 1 illustrates a schematic view of a vehicle seat assembly 100. The vehicle seat assembly 100 may be adapted for use in a motor vehicle, such as a car or truck, or may be used in with other seat assemblies including in aircraft, theater seats or any suitable seat assemblies. While the vehicle seat assembly 100 is illustrated in FIG. 1 to be a bucket seat assembly, it should be understood that the principles of the present disclosure are applicable to other types of seat assemblies, such as bench, captain, and other types of seat assemblies.

As shown in FIG. 1, the vehicle seat assembly 100 includes a seatback 110 and a seat bottom 120, connected to form seat assembly 100 and support an occupant in the vehicle. The seatback 110 may be pivotally mounted to seat bottom 120. The seat bottom 120 may be mounted on a seat frame (not shown), which can be removably secured to the vehicle floor. In some embodiments, the seatback 110 may include a head restraint 160. In at least one embodiment, each of the seatback 110 and seat bottom 120 include foam cushion 130, 140, respectively. The foam cushion 130, 140 can be conventionally secured to a seat frame (not shown) by any method generally known in the art. Each foam cushion 130, 140 may be one or more foam parts, joined together to form the seat component. For example, the seatback 110 foam cushion 130 may include side bolster portions 132, or any other components to meet a selected design. The foam cushions 130, 140 can have any suitable size and configuration, based on a selected design for the vehicle seating arrangement. The seatback foam cushion 130 and the seat bottom foam cushion 140 can independently comprise any suitable comfort foam material such as, but not limited to, a suitable resilient polymer, and can independently be formed in any suitable manner. For example, the foam cushions 130, 140 may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, latex foams and the like. The foam cushions 130, 140 are formed of any suitable comfort material that provides soft resilience as the seat assembly is deflected during use when an occupant is in a seated position.

The vehicle seat assembly 100 also includes one or more trim cover assemblies 150 adapted to engage the foam cushions 130, 140 in a covering relationship. The trim cover assembly 150 may include any trim material commonly known in the art. By way of example, some of the known materials include cloth, leather, or polymers of sufficient quality and thickness for use in seat trim applications. Additionally, materials for use in trim cover assembly 150 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of trim cover assembly 150 for increasing strength without increasing rigidity.

Coatings are used on trim materials to meet various specifications, typically with additives to improve particular properties. Different additives can be used in coatings to impart various properties onto the trim material, such as haptics (feel for a natural dry surface), improved inter-coat adhesion, reduce VOC emissions, fewer mixing issues, and improved abrasion and wear resistance. Stringent original equipment manufacturer specifications require that the properties of the trim material meet certain standards. The specifications include requirements for volatile organic compounds (VOCs), abrasion, adhesion, hydrolysis, moisture sensitivity, friction coefficient, flexibility, soiling/cleanability, water vapor permeability, UV resistance/lightfastness, gloss/jetness, and others.

In the trim material treating and preparing process, the trim material typically undergoes finishing steps, such as a coating application, to improve various properties to meet different specifications, such as those set by original equipment manufacturers. The trim material may be finished using one or more processing steps or techniques. Non-limiting examples of finishing coatings for trim materials, such as automotive leather, include resins, waxes, silicones, and pigments, among others. Coatings are used on trim materials to meet these various specifications, typically with additives specifically included to improve particular properties. Different additives can be used in coatings to impart various properties onto the trim materials, however certain properties may be compromised when improving other properties.

Abrasion testing for the coating is one of the specifications reviewed. During abrasion testing (as well as during other types of testing), the coating is gradually worn away such that the crust of the trim material is exposed. The crust exposure is typically considered the point of failure to vehicle occupants. Conventional coatings are water-based coatings and include silicone to improve the abrasion resistance, typically in the topcoat(s). If high amounts of silicone are incorporated in the coatings, improved wear resistance can be the result due to reduced surface friction. However, a coating with high silicone content may have a slippery and plastic feel, thus reducing the haptic element for the vehicle occupants. Additionally, the silicone additive in conventional coatings is not bound in to the film permanently, and can transfer to the occupant's body (e.g., hands or legs), or clothing. Furthermore, in the conventional lower coating layers, higher amounts of silicone are avoided because of issues with inter-coating adhesion.

According to embodiments, a trim coating including encapsulated silicone is disclosed. The encapsulated silicone refers to silicone oil filled in microcapsules (or, interchangeably capsules) formed of a polymeric shell. The capsules may be generally spherical shaped, however other shapes are also contemplated and reference to spheres and/or diameters is not intended to be limiting. For non-spherical capsules, the particle size is based on the largest dimension (length or width) of the capsule, however particle size diameter is used hereinafter to generally refer to both spherical and non-spherical capsules, and, in some embodiments, a diameter of a spherical capsule may refer to a non-spherical capsule of the same volume. In other embodiments, the diameter may be the average of the dimensions of the capsules. The capsules, in certain embodiments, may have a particle size diameter of about 0.1 to 80 microns, and in other embodiments, 0.25 to 50 microns, and yet other embodiments 0.5 to 10.0 microns. In further embodiments, the 90% of the capsules may have a particle size diameter of less than about 3.0 microns. The encapsulated silicone may be included in any finishing layer for the trim material, such as but not limited to the topcoat(s), color coat(s), or base coat(s). The coatings including the encapsulated silicone spheres are aqueous coatings, such as but not limited to, an aqueous base coat or an aqueous topcoat. This encapsulated silicone can replace part or all of the silicone used in the topcoat formulation. As the finish is abraded during normal use, the capsule walls rupture such that a limited amount of silicone is released over time. The released silicone lubricates the surface of the trim material as the coating is worn, reducing surface friction and improving the wear resistance of the trim cover over an extended period of time without forming a slippery and high-gloss surface caused by conventional silicone application. Inclusion of the encapsulated silicone in the trim cover coating layers further improves inter-coat adhesion between the coating layers on the trim material.

Referring to FIG. 2, a schematic exploded cross section of coated trim cover assembly 200 is shown, according to an embodiment. Trim crust 210 is provided with a first base coat 220. Trim crust 210 may be any suitable trim material (e.g., leather, vinyl, fabric, etc.), as discussed as trim cover 150, and any discussion of a leather trim material is not intended to be limiting but is used as an example of a trim material suitable for use with encapsulated silicone coatings of the present disclosure. The first base coat 220 is then coated with a thermoplastic color coat 230, or second base coat 230. Although two base coats are shown in FIG. 2, it is contemplated in other embodiments that only one base coat may be used, or more base coats may be used based on the desired finish and properties. Similarly, one or more of the base coats may include a pigment, thus making it a color coat. However, in some embodiments, the base coat(s) may not include a pigment.

Referring again to FIG. 2, the base coats 220 and 230 are coated with a first topcoat 240 and a second topcoat 250. Although two topcoats are shown in FIG. 2, it is contemplated that in certain embodiments, only one topcoat layer may be used, or more topcoat layers may be used based on the desired finish and properties. Similarly, one or more of the topcoats may include a pigment, thus making it a color coat, however in some embodiments, the topcoat(s) may not include a pigment.

Encapsulated silicone 260 is included in at least one of the coating layer for the trim cover, for providing limited release of silicone oil as the coatings are abraded such that the trim material maintains a silky surface feel and low gloss, without increasing the glossy look of the trim material. Although in FIG. 2, encapsulated silicone 260 is shown within all of the coating layers (i.e., the base coats 220, 230 and topcoats 240, 250), encapsulated silicone 260 may be included in any one coating, or in any combination of one or more coatings that are applied to the trim cover. For example, the encapsulated silicone 260 may be included in a single topcoat in certain embodiments, a single base coat in other embodiments, or in one of the topcoats and one of the base coats in yet another embodiment. Furthermore, any number of coatings may be present to form the trim cover assembly 200, and the depiction in FIG. 2 is an example of a trim cover 150 of FIG. 1. For example, trim cover 200 may include only one topcoat in some embodiments, or may include multiple color coats (coatings with pigment) in another embodiment, and so on. The encapsulated silicone 260 is included in one or more of the coating layers such that as the layers are abraded over time, one or more silicone filled capsules rupture to improve the surface during aging (wear improvement), without impacting the haptic feel of the surface, the adhesion between layers, or the glossiness of the layers.

Referring to FIG. 3, an example of the encapsulated silicone 260 (or capsule 260) is schematically shown. The capsules may be generally spherical shaped, however other shapes are also contemplated and reference to spheres and/or diameters is not intended to be limiting. Encapsulated silicone 260 includes a shell or wall 262, filled with silicone oil 264 within the shell or wall 262. The silicone oil 264 is a pure non-emulsified silicone oil or wax silicone. Suitable silicones include, but are not limited to silanol- or amino-functional polydimethylsiloxane-based silicones to improve anti-soil/stain properties, or a combination thereof. The amount of silicone oil 264 in each capsule is 60-90% by weight of the capsule, the balance being the weight of the shell 262. In certain embodiments, the wet composition of a slurry including the encapsulated silicone 260 is 45-48% water (CAS 7732-18-5), 30-33% silicone oil (CAS 63148-62-9), and 21-23% shell wall. The shell 262 of the encapsulated silicone 260 may have a shear or stress strength capable of withstanding shear during mixing of a coating to incorporate the encapsulated silicone 260, as well as withstanding the application of the coating to the trim material surface or to the other coating(s) on the trim material surface (e.g., by rolling). However, the shell 262 is of a shear or stress strength such that it can withstand the impact pressure, but also be ruptured through repeated abrasion and/or wear of the coating surface. The shell 262 may be any suitable polymeric material such as, but not limited, to polyurethane, acrylic, or polyethylene. In other embodiments, the shell 262 may include Capric Caprylic Triglyceride. The shell 262 is further made of a material that meets standard requirements (e.g., VOC emissions).

The encapsulated silicone 260 may be sized to blend into the coating(s) and not be visible to the naked eye. Furthermore, the encapsulated silicone 260 does not impart any variation in surface feel to the trim cover prior to rupturing. The encapsulated silicone 260 is on a scale to provide micro-doses of the silicone oil. In one or more embodiments, the encapsulated silicone particles 260 have any suitable average particle size such that the feel of the coating is not altered, and such that the shells rupture upon abrasion to release a limited amount of silicone oil. The particle size (i.e., based on an average diameter D as shown in FIG. 3) of the encapsulated silicone 260 may be, in certain embodiments, between 0.1 and 80 microns, in some embodiments, between 0.1 and 50.0 microns, in other embodiments 0.25 and 25 microns, and in yet other embodiments 0.5 and 10 microns. In some embodiments, the capsules are all substantially the same size (i.e., +/−3 microns), and in other embodiments, the capsule sizes included in the coating of each capsule may vary between 5 and 80 microns. In further embodiments, at most about 90% of the capsules have a particle size diameter of less than about 40 microns. In yet further embodiments, at most 80% of the capsules have a particle size diameter of less than about 30 microns. In certain other embodiments, at most about 90% of the capsules have a particle size diameter of less than about 5 microns. In yet further embodiments, at most 80% of the capsules have a particle size diameter of less than about 3 microns. Furthermore, in certain embodiments, where the encapsulated silicone 260 may include a plurality of capsules of different sizes, the varying size alters the point at which the shell ruptures to release the silicone oil, thus providing improved wear resistance over time.

The coating(s) may include the encapsulated silicone 260 as a component, as measured by weight percent. The coating may include up to 25 wt. % of the encapsulated silicone. In certain embodiments, each of the coating(s) may include up to 22 wt. % of the encapsulated silicone, in other embodiments, up to 20 wt. % of the encapsulated silicone, and yet other embodiments, up to 17.5 wt. % of the encapsulated silicone. In other embodiments, respectively, each of the coating(s) includes 1 to 25 wt. % of the encapsulated silicone; 3 to 20 wt. % of the encapsulated silicone; 5 to 15 wt. % of the encapsulated silicone; 1 to 20 wt. % of the encapsulated silicone; 2 to 20 wt. % of the encapsulated silicone; 3 to 20 wt. % of the encapsulated silicone; and in yet other embodiments 5 to 20 wt. % of the encapsulated silicone. Furthermore, the weight of the encapsulated silicone included may be, in some embodiments, be based on the silicone content. As such, the coating may include up to 25 wt. % of silicone. In certain embodiments, each of the coating(s) may include up to 22 wt. %, in other embodiments, up to 20 wt. % silicone, and yet other embodiments, up to 17.5 wt. % silicone. In other embodiments, respectively, each of the coating(s) includes 1 to 25 wt. % silicone; 3 to 20 wt. % silicone; 5 to 15 wt. % silicone; 1 to 20 wt. % silicone; 2 to 20 wt. % silicone; 3 to 20 wt. % silicone; and in yet other embodiments 5 to 20 wt. % silicone. The coating(s) may include other components, such as pigments, feel-modifiers, or other suitable additives for meeting requirements for the trim material.

Figure 5:
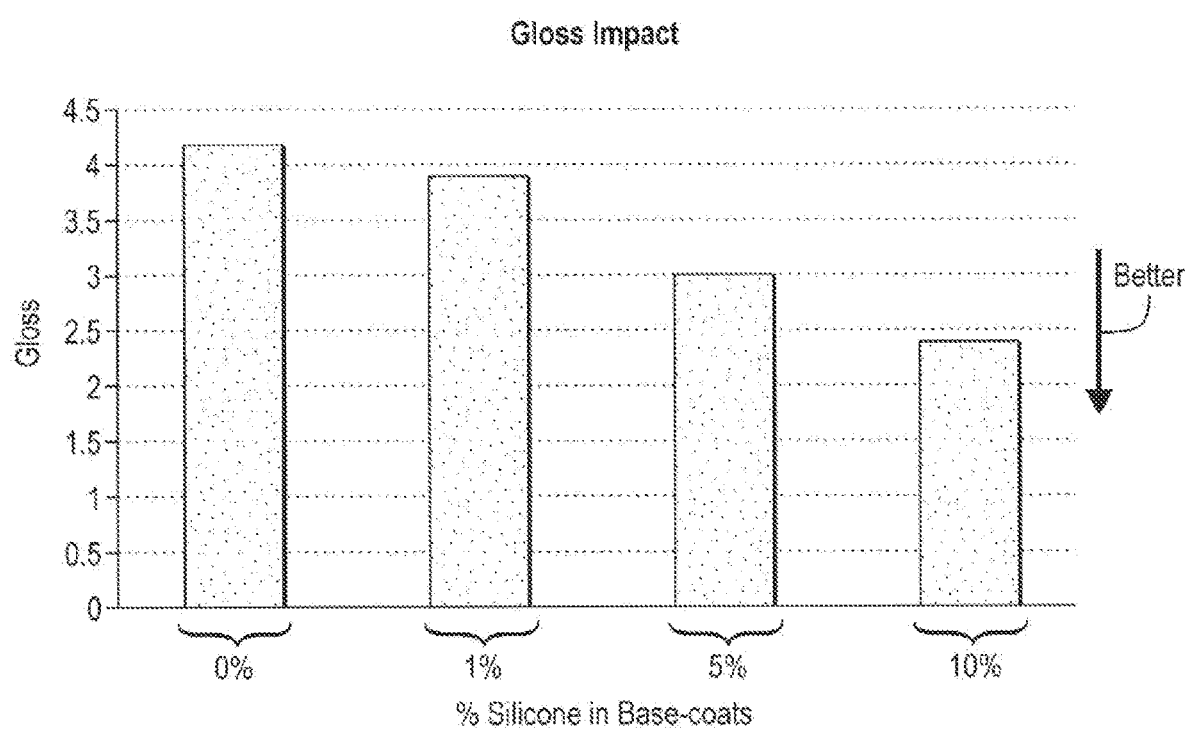
FIG. 5 shows the Gloss Impact for the coatings of FIGS. 4A-B.

Trim materials with coating(s) incorporating encapsulated silicone have improved abrasion test performance when compared with conventional coatings without encapsulated silicone. The shell 262 may have a suitable thickness such that the shell ruptures to provide an abrasion resistance of 5,000 to 12,000 as under a Taber test (CS-10). In certain embodiments, the shell may have a thickness of 0.01 to 30 microns, in other embodiments 0.03 to 20 microns, and in yet other embodiments, 0.05 to 15 microns. In certain other embodiments, the shell may have a thickness of 0.01 to 3 microns. Thus, the encapsulated silicone provides an improvement in abrasion resistance over the conventional coatings (shown in FIGS. 4A-B having 0% encapsulated silicone and an average Taber value of 2,333). In certain embodiments, the abrasion resistance under the Taber test may vary based on the encapsulated silicone content of the coating, as shown in FIGS. 4A-B. Thus, the coating including the encapsulated silicone may provide a wear resistance of at least 8,000 cycles with at least 1% by weight of encapsulated silicone in the base-coating. In other embodiments, the base-coating provides a wear resistance of at least 10,000 cycles with at least 5% by weight of the encapsulated silicone in the coating. In yet another embodiment, the coating provides a wear resistance of about 12,000 cycles with 10% by weight of the encapsulated silicone in the coating. It is contemplated that including the encapsulated silicone 260 in additional layers on the trim material, up to 25% by weight of the base-coating, or both, may further provide higher wear resistance above 12,000 cycles. Similarly, the inclusion of encapsulated silicone 260 in at least one coating provides improvement in gloss, as shown in FIG. 5, where coatings with 1%, 5%, and 10%, respectively have a better Gloss Impact than a coating with no encapsulated silicone (0%). (Gloss Impact is measured using a Microgloss 3-series Glossmeter at reading angle 60 degrees (ISO 2813, 7668; ASTM D523, DIN 67530; JIS Z 8741).

The coating(s) may be applied to the trim cover in any suitable manner such that the encapsulated silicone does not rupture during application. For example, in some embodiments, the coating(s) may be spray coats, and in other embodiments, the coating(s) may be roll coats. The strength of the shell of the encapsulated silicone may vary depending on the application method selected, to reduce premature rupturing of the encapsulated silicone prior to abrasion during use.

According to one or more embodiments, a trim material is coated with a coating including encapsulated silicone to release silicone oil such that the trim material maintains a smooth finish and avoids signs of wearing. The encapsulated silicon ruptures upon abrasion over time, and provides a micro-dose of silicon oil to improve the performance of the trim material over time. The encapsulated silicone may be included in any finishing coating(s) for the trim material, and is sized such that the coating surface(s) remain smooth and/or natural.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coated trim cover comprising:
    a trim cover material having an occupant support surface and an inner surface, opposite to the occupant support surface; and
    one or more coating layers on the occupant support surface, with at least one of the one or more coating layers including encapsulated silicone.

2. The coated trim cover of claim 1, wherein the encapsulated silicone includes a polymeric shell and silicone oil within the polymeric shell.

3. The coated trim cover of claim 1, wherein the polymeric shell has an average particle size of 0.5 to 10 microns.

4. The coated trim cover of claim 1, wherein the coated trim cover has a Taber performance under CS-10 of at least 10,000 cycles with at least 5 wt. % encapsulated silicone in the at least one of the one or more coating layers.

5. The coated trim cover of claim 1, wherein the at least one of the one or more coating layers includes up to 25 wt. % of the encapsulated silicone.

6. The coated trim cover of claim 1, wherein the encapsulated silicone has an average particle size of 0.1 to 50 microns.

7. The coated trim cover of claim 1, wherein the one or more coating layers are thermoplastic color coats, base coats, topcoats, or combinations thereof.

8. A seat comprising:
    a foam body; and
    a trim cover assembly covering the foam body, the trim cover assembly having a trim material with an occupant support surface and an inner surface opposite to the occupant support surface, the trim cover assembly including a base coat layer on the occupant support surface and a top coat layer on the base coat layer, the top coat layer including encapsulated silicone.

9. The seat of claim 8, wherein the encapsulated silicone includes a polymeric shell and silicone oil within the polymeric shell.

10. The seat of claim 9, wherein the polymeric shell has an average particle size of 0.5 to 10 microns.

11. The seat of claim 8, wherein the top coat layer includes up to 25 wt. % of the encapsulated silicone.

12. The seat of claim 8, wherein at least 90% of the encapsulated silicone has an average particle size of less than 30 microns.

13. The seat of claim 8, wherein the trim cover assembly has a Taber performance under CS-10 of at least 8,000 cycles with at least 1 wt. % encapsulated silicone in the at least one coating.

14. The seat of claim 13, wherein the trim cover assembly has a Taber performance under CS-10 of at least 10,000 cycles with at least 5 wt. % encapsulated silicone in the at least one coating.

15. The seat of claim 8, wherein the encapsulated silicone has an average particle size of 0.1 to 50 microns.

16. The seat of claim 8, wherein the base coat layer includes encapsulated silicone.

17. The seat of claim 16, wherein the encapsulated silicone of the base coat layer includes a polymeric shell and silicone oil within the polymeric shell.

18. A seat comprising:
    a foam body; and
    a trim cover assembly covering the foam body, the trim cover assembly having a trim material with an occupant support surface and an inner surface opposite to the occupant support surface, the trim cover assembly including one or more coating layers on the occupant support surface, with at least base coat layer and at least one top coat layer, with at least one of the base coat layers and at least one of the top coat layers each including encapsulated silicone.

19. The seat of claim 18, wherein the encapsulated silicone includes a polymeric shell and silicone oil within the polymeric shell.

20. The seat of claim 18, wherein each layer including encapsulated silicone includes up to 25 wt. % of the encapsulated silicone.

* * * * *